(12) United States Patent
Wong et al.

(10) Patent No.: US 7,680,462 B2
(45) Date of Patent: Mar. 16, 2010

(54) WIRELESS TRANSCEIVER SYSTEM

(75) Inventors: Kwo-Jyr Wong, Tu-Cheng (TW); Mu-Jung Chiu, Tu-Cheng (TW); Jane-Yi Pieh, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 797 days.

(21) Appl. No.: 11/510,104

(22) Filed: Aug. 25, 2006

(65) Prior Publication Data

US 2007/0213006 A1 Sep. 13, 2007

(30) Foreign Application Priority Data

Mar. 8, 2006 (CN) .................... 2006 1 0034228

(51) Int. Cl.
*H04B 1/44* (2006.01)
(52) U.S. Cl. .................... 455/78; 455/83; 455/13.4; 455/88; 455/127.1; 455/277.1; 343/702; 343/715; 330/305; 330/302; 330/129
(58) Field of Classification Search .................... 455/78, 455/83, 88, 13.4, 127.1, 277.1; 330/129
See application file for complete search history.

(56) References Cited

U.S. PATENT DOCUMENTS

| | | | |
|---|---|---|---|
| 5,502,715 A | 3/1996 | Penny | |
| 6,266,545 B1 * | 7/2001 | Backman et al. | 455/572 |
| 6,529,088 B2 * | 3/2003 | Lafleur et al. | 333/17.1 |
| 6,925,312 B2 * | 8/2005 | Skarby | 455/561 |
| 6,927,627 B2 * | 8/2005 | Schumacher et al. | 330/129 |
| 7,071,776 B2 * | 7/2006 | Forrester et al. | 330/129 |
| 7,092,679 B2 * | 8/2006 | Khorram | 455/78 |
| 7,505,742 B2 * | 3/2009 | Sharp et al. | 455/127.1 |
| 7,515,884 B2 * | 4/2009 | Blech et al. | 455/127.1 |

FOREIGN PATENT DOCUMENTS

| | | |
|---|---|---|
| CN | 1365582 A | 8/2002 |
| CN | 1567740 A | 1/2005 |
| EP | 1147621 B9 | 8/2004 |
| JP | 10-107728 | 4/1998 |

* cited by examiner

*Primary Examiner*—Marceau Milord
(74) *Attorney, Agent, or Firm*—Wei Te Chung

(57) ABSTRACT

A wireless transceiver system for compensating a transport loss includes a transceiver (100), a tower mounted amplifier (TMA) (200), and a transport loss detector (400). The transceiver transmits a first signal at a transmit power. The first signal is changed into a second signal after cable attenuation from the transceiver. The TMA is connected to the transceiver via a cable, receives a second signal, and amplifies the second signal. The transport loss detector is connected to the TMA, and calculates a transport loss between the transceiver and the TMA. The TMA further compensates the transport loss between the transceiver and the TMA according to the calculated result of the controller.

17 Claims, 3 Drawing Sheets

WIRELESS TRANSCEIVER SYSTEM

BACKGROUND OF THE INVENTION

1. Field of the Invention

The invention relates to communication systems, and particularly to a wireless transceiver system.

2. Description of Related Art

FIG. 1 is a schematic diagram of a conventional wireless transceiver system. The conventional wireless transceiver system includes a transceiver 10, a tower mounted amplifier (TMA) 20, and an antenna 30. The antenna 30 and the TMA 20 are located on an outdoor tower outside a building, and the TMA 20 is connected to the antenna 30. The transceiver 10 is disposed inside the building. The transceiver 10 is connected to the TMA 20 via a cable. Therefore, there is a transport loss between the transceiver 10 and the TMA 20. The transport loss includes a cable loss and a connector loss.

The transport loss between the transceiver 10 and the TMA 20 cannot be accurately measured, so the TMA 20 cannot accurately compensate the transport loss. As a result, an output power of the TMA 20 may exceed a legal power limit, and the TMA 20 may work in a non-linear region. Therefore, the efficiency of the wireless transceiver system is lowered.

SUMMARY OF THE INVENTION

An exemplary embodiment of the present invention provides a wireless transceiver system that compensates a transport loss. The wireless transceiver system includes a transceiver, a tower mounted amplifier (TMA), and a transport loss detector. The transceiver transmits a first signal at a transmit power. The first signal is changed into a second signal after cable attenuation from the transceiver. The TMA is connected to the transceiver via a cable, for receiving the second signal from the transceiver and amplifying the second signal. The transport loss detector is connected to the TMA, for calculating a transport loss between the transceiver and the TMA. The transport loss detector includes a first radio frequency (RF) power detector and a controller. The first RF power detector detects the second signal power. The controller calculates the transport loss between the transceiver and the TMA according to the second signal power and the transmit power of the transceiver. The TMA further compensates the transport loss between the transceiver and the TMA according to the calculated result of the controller.

Other advantages and novel features will become more apparent from the following detailed description when taken in conjunction with the accompanying drawings, in which:

DETAILED DESCRIPTION OF THE INVENTION

Figure 1:
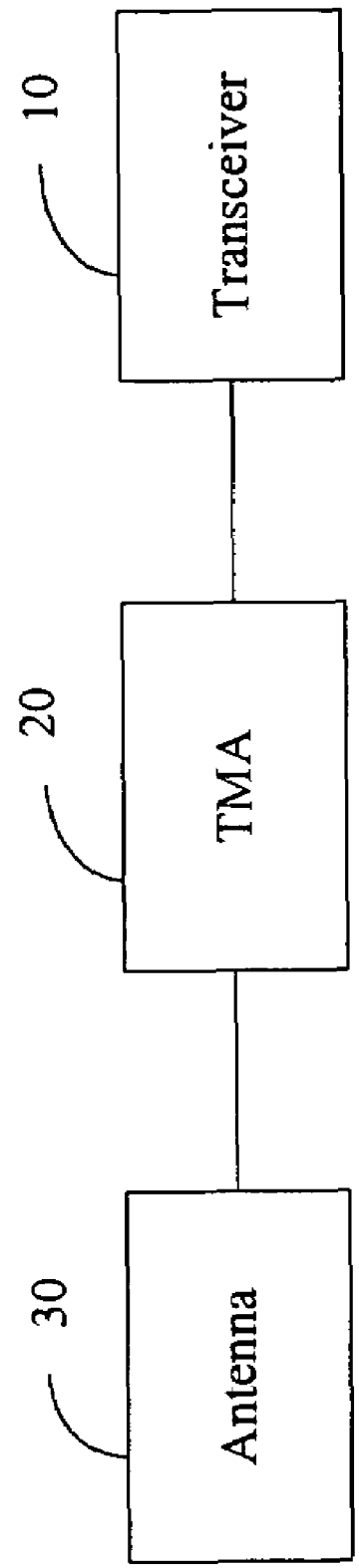
FIG. 1 is a schematic diagram of a conventional wireless transceiver system.
Figure 2:
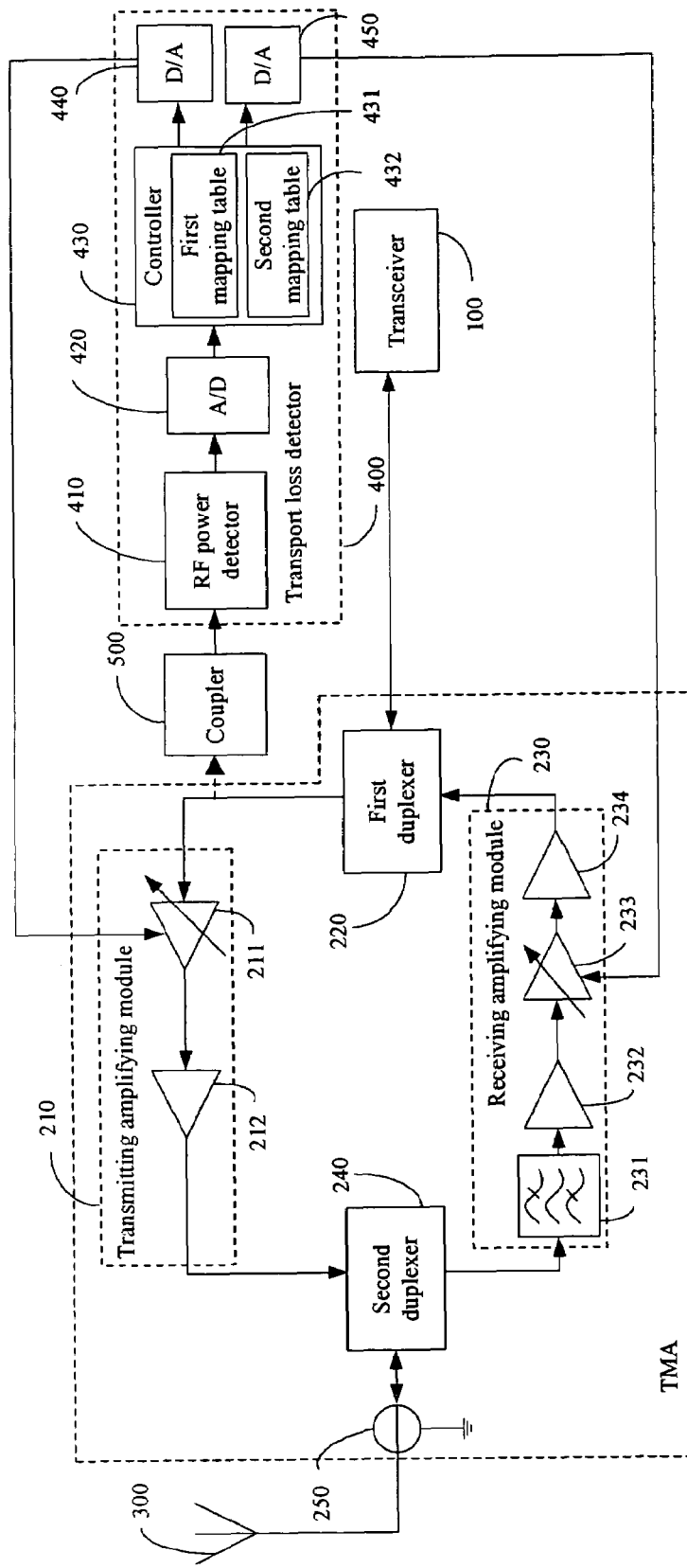
FIG. 2 is a schematic diagram of functional modules of a wireless transceiver system of an exemplary embodiment of the invention.

FIG. 2 is a schematic diagram of functional modules of a wireless transceiver system of an exemplary embodiment of the invention. In the exemplary embodiment, the wireless transceiver system is in a frequency division duplex (FDD) mode. The wireless transceiver system can accurately compensate a transport loss, and includes a transceiver 100, a tower mounted amplifier (TMA) 200, an antenna 300, and a transport loss detector 400. The antenna 300 and the TMA 200 are located on an outdoor tower outside a building, and the TMA 200 is connected to the antenna 300. The transceiver 100 is disposed indoors, i.e., inside the building. The transceiver 100 is connected to the TMA 200 via a cable. Therefore, there is a transport loss between the transceiver 100 and the TMA 200. In the exemplary embodiment, the transport loss includes a cable loss and a connector loss. In other embodiments, the transport loss may include other losses.

The antenna 300 transmits and receives signals. The transceiver 100 transmits a first signal to the TMA 200 at a transmit power. Due to the transport loss between the transceiver 100 and the TMA 200, the first signal is changed into a second signal after cable attenuation from the transceiver 100. Namely, the difference between the transmit power of the transceiver 100 and the second signal power is the transport loss between the transceiver 100 and the TMA 200.

The TMA 200 receives the second signal, and amplifies the second signal to a third signal. Then, the third signal is transmitted via the antenna 300. The transport loss detector 400 is connected to the TMA 200, and calculates the transport loss between the transceiver 100 and the TMA 200, namely calculating the difference between the transmit power of the transceiver 100 and the second signal power. The transport loss detector 400 may be included in a finished product of the TMA 200. The TMA 200 further compensates the transport loss between the transceiver 100 and the TMA 200 according to the calculated result of the transport loss detector 400.

The TMA 200 includes a transmitting amplifying module 210, a first duplexer 220, a receiving amplifying module 230, and a second duplexer 240, and a lightning arrester 250. The first duplexer 220 is connected to the transceiver 100, the transmitting amplifying module 210, and the receiving amplifying module 230, for transmitting signals from the transceiver 100 to the transmitting amplifying module 210 and transmitting signals from the receiving amplifying module 230 to the transceiver 100. The second duplexer 240 is connected to the transmitting amplifying module 210, the receiving amplifying module 230, and the lightning arrester 250, for transmitting signals from the transmitting amplifying module 210 to the antenna 300 via the lightning arrester 250 and transmitting signals from the antenna 300 to the receiving amplifying module 230 via the lightning arrester 250. The lightning arrester 250 protects the TMA 200 in the event of a lightning strike.

The transmitting amplifying module 210 is connected between the first duplexer 220 and the second duplexer 240, for amplifying the second signal to the third signal. Then the third signal is transmitted via the antenna 300. In the exemplary embodiment, the transmitting amplifying module 210 includes a variable gain amplifier (VGA) 211 and a fixed gain amplifier (FGA) 212.

In other embodiments, the transmitting amplifying module 210 may omit amplifiers, and further include other filters or other types of amplifiers.

The VGA 211 is connected to the first duplexer 220, for amplifying the second signal. The FGA 212 is connected between the VGA 211 and the second duplexer 240, for amplifying signals from the VGA 211.

The receiving amplifying module 230 is connected between the first duplexer 220 and the second duplexer 240, for amplifying signals from the antenna 300 and transmitting the amplified signals to the transceiver 100 via the cable. In the exemplary embodiment, the receiving amplifying module 230 includes a filter 231, a low noise amplifier (LNA) 232, a VGA 233, and a FGA 234.

In other embodiments, the receiving amplifying module 230 may include other types of filters or other amplifiers such as a low power amplifier (LPA).

The filter 231 is connected to the second duplexer 240, for filtering signals from the antenna 300 to acquire useful signals. The LNA 232 is connected to the filter 231, for amplifying signals from the filter 231. The VGA 233 is connected to the LNA 232, for amplifying signals from the LNA 232. The FGA 234 is connected between the VGA 233 and the first duplexer 220, for amplifying signals from the VGA 233.

In the exemplary embodiment, the wireless transceiver system further includes a coupler 500. The coupler 500 is coupled between the first duplexer 220 and the transmitting amplifying module 210, and connected to the transport loss detector 400, for coupling the second signal to the transport loss detector 400. In this embodiment, the coupler 500 is a directional coupler. In other embodiments, the coupler 500 may be other couplers.

The transport loss detector 400 is connected to the TMA 200 via the coupler 500, for calculating the transport loss between the transceiver 100 and the TMA 200 and transmitting the calculated transport loss (calculated result) to the TMA 200. In the exemplary embodiment, the transport loss detector 400 includes a radio frequency (RF) power detector 410, an analog/digital (A/D) converter 420, a controller 430, and two digital/analog (D/A) converters 440, 450.

In the exemplary embodiment, the second signal power is required to be converted to a first analog signal, and the first analog signal is converted to a first digital signal, which is recognizable by the controller 430.

The RF power detector 410 is connected to the coupler 500, for detecting the second signal power and converting the second signal power to the first analog signal. In the exemplary embodiment, the first analog signal is a voltage signal. In another embodiment, the first analog signal may be a current signal.

The A/D converter 420 is connected to the RF power detector 410, for converting the first analog signal to the first digital signal.

The controller 430 calculates the transport loss between the transceiver 100 and the TMA 200 according the second signal power and the transmit power of the transceiver 100. In the exemplary embodiment, the controller 430 is a micro controller. The controller 430 is connected to the A/D converter 420, for calculating the transport loss between the transceiver 100 and the TMA 200 according to the first digital signal and the transmit power of the transceiver 100.

In the exemplary embodiment, the transmit power of the transceiver 100 is recognizable by the controller 430. The controller 430 can know the transmit power of the transceiver 100 according to the attributes of the transceiver 100, for example, a model type of the transceiver 100.

In another embodiment, the transmit power of the transceiver 100 may be unknown. The transport loss detector 400 can be connected to the transceiver 100 via an existent cable, before the wireless transceiver system is set up. In this embodiment, the existent cable is a very short cable, and a cable loss thereof is insignificant and previously known. The transceiver 100 transmits a fourth signal to the transport loss detector 400 via the existent cable at the transmit power of the transceiver 100. The transport loss detector 400 receives a fifth signal. The fourth signal is changed to the fifth signal after attenuation by the existent cable from the transceiver 100. Therefore, the transmit power of the transceiver 100 is the sum of the fifth signal power and the cable loss of the existent cable. The controller 430 detects the fifth signal power via the RF power detector 410 and the A/D converter 420, and calculates the sum of the fifth signal power and the cable loss of the existent cable to obtain the transmit power of the transceiver 100.

In the exemplary embodiment, the controller 430 can know the second signal power according to the first digital signal. The difference between the transmit power of the transceiver 100 and the second signal power is the transport loss between the transceiver 100 and the TMA 200, so the controller 430 can calculate the transport loss between the transceiver 100 and the TMA 200 according to the first digital signal and the transmit power of the transceiver 100.

The controller 430 stores a first mapping table 431 and a second mapping table 432. The first mapping table 431 includes a mapping relation between control signals and gains of the VGA 211. The relation between control signals and gains of the VGA 211 is a linear relationship.

In other embodiments, the relation between control signals and gains of the VGA 211 may not be a linear relationship.

In the exemplary embodiment, the controller 430 generates a first digital control signal according to the first mapping table 431 and the transport loss between the transceiver 100 and the TMA 200. For example, if the mapping relation between the control signals and gains of the VGA 211 is as follows: control voltages (namely control signals) 0V-10V corresponding to gains 0 dB-10 dB, and the transport loss from the transceiver 100 to the TMA 200 is 6 dB, then the first digital control signal must be 6 volts.

The second mapping table 432 includes a mapping relation between control signals and gains of the VGA 233. The relation between control signals and gains of the VGA 233 is a linear relationship.

In other embodiments, the relation between control signals and gains of the VGA 233 may not be a linear relationship. The controller 430 may not store the first mapping table 431 and the second mapping table 432, but only store the relation between control signals and gains of the VGA 211 and the relation between control signals and gains of the VGA 233.

In the exemplary embodiment, the controller 430 further generates a second digital control signal according to the second mapping table 432 and the transport loss between the transceiver 100 and the TMA 200. The controller 430 needs to continuously provide the second digital control signal for the VGA 233 so that the VGA 233 can pre-compensate the transport loss from the TMA 200 to the transceiver 100 for received signals when the TMA 200 receives signals.

The D/A converter 440 converts the first digital control signal to a first analog control signal. In the exemplary embodiment, the first analog control signal is a voltage signal. In another embodiment, the first analog control signal may be a current signal.

The D/A converter 450 converts the second digital control signal to a second analog control signal. In the exemplary embodiment, the second analog control signal is a voltage signal. In another embodiment, the second analog control signal may be a current signal.

The TMA 200 further compensates the transport loss from the transceiver 100 to the TMA 200 according to the first analog control signal, and pre-compensates the transport loss from the TMA 200 to the transceiver 100 according to the second analog control signal. In the exemplary embodiment, when the wireless transceiver system sends signals, the VGA 211 compensates the transport loss from the transceiver 100 to the TMA 200. In the above example, the VGA 200 compensates for the transport loss of 6dB according to the 6V voltage. When the wireless transceiver system receives signals, the VGA 233 pre-compensates the transport loss from the TMA 200 to the transceiver 100 according to the second analog control signal.

Figure 3:
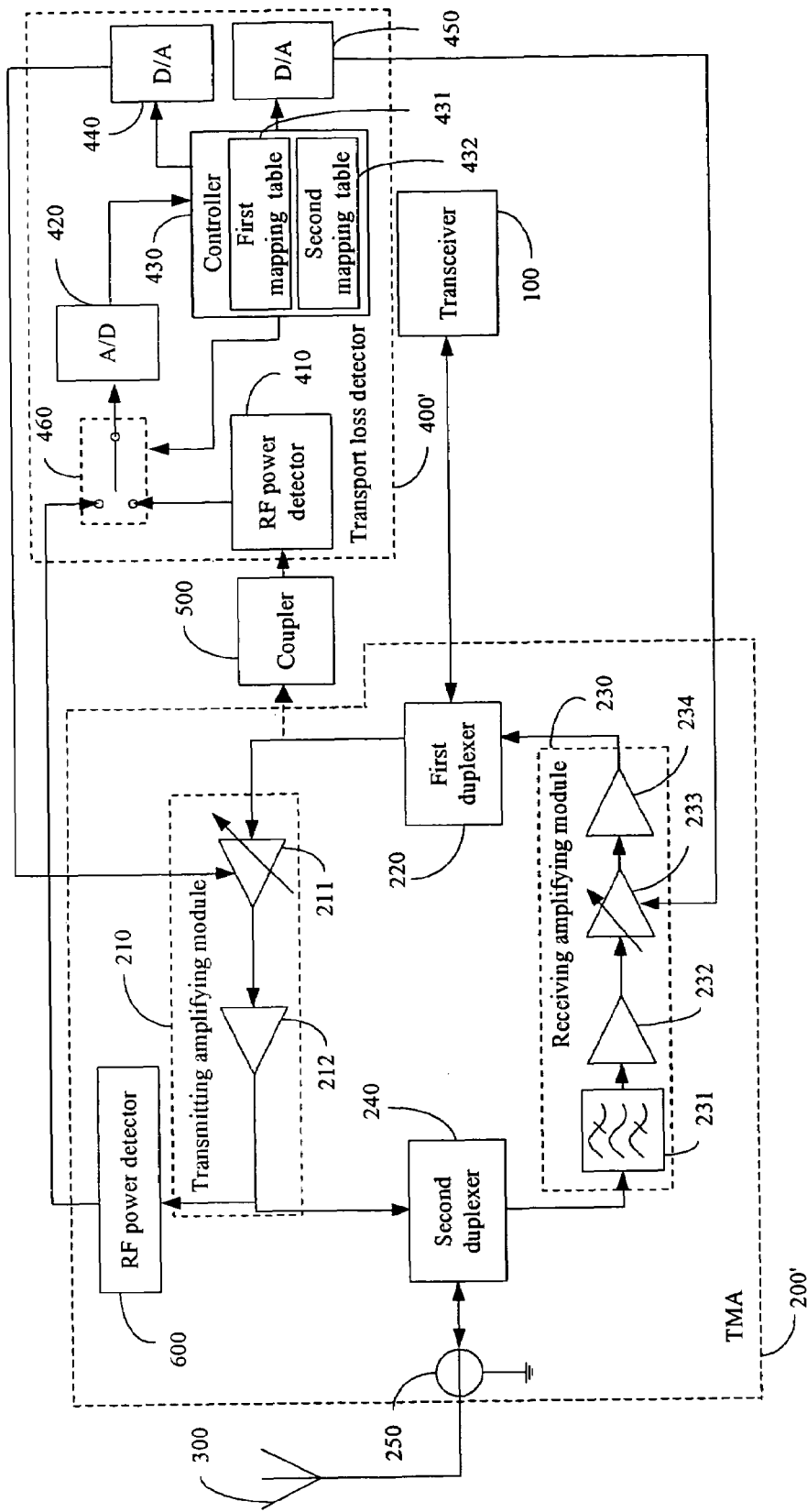
FIG. 3 is a schematic diagram of functional modules of a wireless transceiver system of another exemplary embodiment of the invention.

FIG. 3 is a schematic diagram of functional modules of a wireless transceiver system of another exemplary embodiment of the invention. The wireless transceiver system of this embodiment is similar to the wireless transceiver system of FIG. 2. The difference therebetween is that a TMA 200' of this embodiment further includes a RF power detector 600, and a transport loss detector 400' of this embodiment further includes a switch 460. Other modules of this embodiment are the same as that of FIG. 2, so descriptions are omitted.

In the exemplary embodiment, the wireless transceiver system further monitor an output power of the TMA 200' by the transport loss detector 400'. During a system setup stage of the wireless transceiver system, the transport loss detector 400' calculates the transport loss between the transceiver 100 and the TMA 200'. At other stages, the transport loss detector 400' monitors the output power of the TMA 200'. The transport loss between the transceiver 100 and the TMA 200' may be changed due to some unplanned circumstances, e.g. typhoon, or too long a period of use. Therefore, the transport loss detector 400' calculates the transport loss between the transceiver 100 and the TMA 200' again after the circumstances, or when needing periodic check-ups. After calculating, the transport loss detector 400' goes on to monitor the output power of the TMA 200'.

The switch 460 is connected among the A/D converter 420, the RF power detector 410, and the RF power detector 600, and controlled by the controller 430 to connect the RF power detector 410 and the A/D converter 420, or connect the RF power detector 600 and the A/D converter 420. When the switch 460 connects the RF power detector 410 and the A/D converter 420, the transport loss detector 400' calculates the transport loss between the transceiver 100 and the TMA 200'. When the switch 460 connects the RF power detector 600 and the A/D converter 420, the transport loss detector 400' monitors the output power of the TMA 200'. Thus, the controller 430 can control the transport loss detector 400' to calculate the transport loss between the transceiver 100 and the TMA 200', or monitor the output power of the TMA 200' according to different requirements.

In the exemplary embodiment, the second signal is amplified to the third signal by the transmitting amplifying module 210. The third signal power is equal to the output power of the TMA 200'. The third signal power is required to be converted to a second analog signal, and the second analog signal is converted to a second digital signal. Then, the controller 430 can know the third signal power according to the second digital signal.

The RF power detector 600 is connected between the transmitting amplifying module 210 and the second duplexer 240, for detecting the third signal power, and converting the third signal power to the second analog signal. In the exemplary embodiment, the second analog signal is a voltage signal. In another embodiment, the second analog signal may be a current signal.

The A/D converter 420 converts the second analog signal to a second digital signal.

The controller 430 monitors the output power of the TMA 200' according to a legal power limit and the second digital signal, namely monitoring the output power of the transmitting amplifying module 210. The legal power limit is a maximal output power of the TMA 200' regulated by a protocol or a standard, e.g. IEEE 802.11a/b/g. In the exemplary embodiment, the controller 430 can know the output power of the TMA 200' according to the second digital signal. Then the controller 430 compares the legal power limit and the output power of the TMA 200'. If the output power of the TMA 200' exceeds the legal power limit, the controller 430 generates a third digital control signal to adjust the gain of the TMA 200' according to the legal power limit, the second digital signal, and the first mapping table 431. For example, if the output power of the TMA 200' exceeds the legal power limit by 2 dB, the gain of the VGA 211 must be lowered by 2 dB in order to make the output power of the TMA 200' not exceed the legal power limit. If the current gain of the VGA 211 is 6 db, the gain of the VGA 211 must be 4 db in order to lower the gain of the VGA 211 by 2 db. If the mapping relation between the control signals and the gains of the VGA 211 is as follows: control signals 0V-10V corresponding to gains 0 dB-10 dB, the third digital control signal must be 4 volts.

The D/A converter 440 converts the third digital control signal to a third analog control signal. In the exemplary embodiment, the third analog control signal is a voltage signal. In another embodiment, the third analog control signal may be a current signal.

The TMA 200' adjusts the gain thereof according to the third analog control signal, in order to make output power thereof not exceed the legal power limit. In the above example, the VGA 211 lowers the output power thereof according to the third analog control signal. Then, the output power of the TMA 200' does not exceed the legal power limit again. Thus, the output power of the TMA 200' is effectively monitored.

In the wireless transceiver system of this embodiment, the transport loss detector 400' accurately calculates the transport loss between the transceiver 100 and the TMA 200', and then the TMA 200' accurately compensates the calculated transport loss. Therefore, the efficiency of the wireless transceiver system is improved.

In addition, the transport loss detector 400' further monitors the output power of the TMA 200'. Thus, the efficiency of the wireless transceiver system is further improved.

While various embodiments and methods of the present invention have been described above, it should be understood that they have been presented by way of example only and not by way of limitation. Thus the breadth and scope of the present invention should not be limited by the above-described exemplary embodiments, but should be defined in accordance with the following claims and their equivalents.

What is claimed is:

1. A wireless transceiver system, for compensating a transport loss, comprising:
    an antenna, for transmitting and receiving signals;
    a transceiver, for transmitting a first signal at a transmit power; wherein the first signal is changed into a second signal after cable attenuation from the transceiver;
    a tower mounted amplifier (TMA) connected to the transceiver via a cable, for receiving the second signal from the transceiver and amplifying the second signal, wherein the TMA comprises a transmitting amplifying module, for amplifying the second signal and transmitting the amplified signal via the antenna; and
    a transport loss detector connected to the TMA, for calculating a transport loss between the transceiver and the TMA, the transport loss detector comprising:
        a first radio frequency (RF) power detector, for detecting the second signal power; and
        a controller, for calculating the transport loss between the transceiver and the TMA according to the second signal power and the transmit power of the transceiver;

wherein the TMA further compensates the transport loss between the transceiver and the TMA according to the calculated result of the controller.

2. The wireless transceiver system as claimed in claim 1, wherein the first RF power detector converts the second signal power to a first analog signal; the transport loss detector further comprises an analog/digital (A/D) converter, for converting the first analog signal to a first digital signal; the controller calculates the transport loss between the transceiver and the TMA according to the first digital signal and the transmit power of the transceiver.

3. The wireless transceiver system as claimed in claim 1, further comprising a coupler coupled to the TMA and connected to the first RF power detector, for coupling the second signal to the first RF power detector.

4. The wireless transceiver system as claimed in claim 1, wherein the transmitting amplifying module comprises a first variable gain amplifier (VGA); the controller stores a relation between control signals and gains of the first VGA; the controller generates a first digital control signal according to the relation and the transport loss between the transceiver and the TMA.

5. The wireless transceiver system as claimed in claim 4, wherein the transport loss detector further comprises a digital/analog (D/A) converter for converting the first digital control signal to a first analog control signal; the first VGA compensates the transport loss from the transceiver to the TMA according to the first analog control signal.

6. The wireless transceiver system as claimed in claim 1, wherein the TMA further comprises a receiving amplifying module, for amplifying signals from the antenna and transmitting the amplified signals to the transceiver via the cable.

7. The wireless transceiver system as claimed in claim 6, wherein the receiving amplifying module comprises a second variable gain amplifier (VGA); the controller stores a relation between control signals and gains of the second VGA; the controller generates a second digital control signal according to the relation and the transport loss between the transceiver and the TMA.

8. The wireless transceiver system as claimed in claim 7, wherein the transport loss detector further comprises a digital/analog (D/A) converter for converting the second digital control signal to a second analog control signal; the second VGA pre-compensates the transport loss from the TMA to the transceiver according to the second analog control signal.

9. The wireless transceiver system as claimed in claim 6, wherein the TMA comprises a first duplexer connected to the transceiver, the transmitting amplifying module, and the receiving amplifying module, for transmitting signals from the transceiver to the transmitting amplifying module and transmitting signals from receiving amplifying module to the transceiver.

10. The wireless transceiver system as claimed in claim 9, further comprising a coupler coupled between the first duplexer and the transmitting amplifying module, and connected to the first RF power detector, for coupling the second signal to the first RF power detector.

11. The wireless transceiver system as claimed in claim 9, wherein the TMA further comprises a second duplexer connected to the transmitting amplifying module, the antenna, and the receiving amplifying module, for transmitting signals from the transmitting amplifying module to the antenna and transmitting signals from the antenna to the receiving amplifying module.

12. The wireless transceiver system as claimed in claim 1, wherein the second signal is amplified to a third signal by the TMA, and the TMA further comprises a second RF power detector, for detecting the third signal power and converting the third signal power to a second analog signal.

13. The wireless transceiver system as claimed in claim 12, wherein the transport loss detector further comprises an analog/digital (A/D) converter and a switch controlled by the controller to connect the first RF power detector and the A/D converter, or connect the second RF power detector and the A/D converter.

14. The wireless transceiver system as claimed in claim 13, wherein the A/D converter converts the second analog signal to a second digital signal; the controller monitors an output power of the TMA according to a legal power limit and the second digital signal.

15. The wireless transceiver system as claimed in claim 14, wherein the TMA further comprises a first variable gain amplifier (VGA); the controller stores a relation between control signals and gains of the first VGA; the controller generates a third digital control signal according to the legal power limit, the second digital signal, and the relation.

16. The wireless transceiver system as claimed in claim 15, wherein the transport loss detector further comprises a digital/analog (D/A) converter, for converting the third digital control signal to a third analog control signal; the first VGA adjusts the gain of the first VGA according to the third analog control signal.

17. The wireless transceiver system as claimed in claim 1, the wireless transceiver system is in a frequency division duplex (FDD) mode.

* * * * *